US008442368B1

(12) United States Patent
Reano et al.

(10) Patent No.: US 8,442,368 B1
(45) Date of Patent: May 14, 2013

(54) CANTILEVER COUPLERS FOR INTRA-CHIP COUPLING TO PHOTONIC INTEGRATED CIRCUITS

(75) Inventors: Ronald M. Reano, Columbus, OH (US); Peng Sun, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 316 days.

(21) Appl. No.: 12/692,346

(22) Filed: Jan. 22, 2010

(51) Int. Cl.
*G02B 6/26* (2006.01)

(52) U.S. Cl.
USPC .............................................. 385/39; 385/29

(58) Field of Classification Search ............ 385/14, 385/29, 39
See application file for complete search history.

(56) References Cited

U.S. PATENT DOCUMENTS

| | | | |
|---|---|---|---|
| 5,261,015 A * | 11/1993 | Glasheen ........................ | 385/23 |
| 6,236,491 B1 * | 5/2001 | Goodwin-Johansson ..... | 359/291 |
| 6,392,233 B1 * | 5/2002 | Channin et al. ............. | 250/338.1 |
| 6,658,176 B2 * | 12/2003 | Amantea ......................... | 385/16 |
| 6,856,712 B2 * | 2/2005 | Fauver et al. .................. | 385/12 |
| 6,886,920 B2 * | 5/2005 | Trauernicht et al. ............ | 347/56 |
| 6,972,889 B2 * | 12/2005 | Goodwin-Johansson et al. ............................. | 359/290 |
| 6,987,898 B2 * | 1/2006 | Tran et al. ....................... | 385/13 |
| 7,215,869 B2 * | 5/2007 | Lee et al. ....................... | 385/140 |
| 7,538,930 B2 * | 5/2009 | Broer et al. ................... | 359/288 |
| 7,555,333 B2 * | 6/2009 | Wang et al. .................... | 600/476 |
| 2002/0001435 A1 * | 1/2002 | Steinberg et al. .............. | 385/49 |
| 2002/0191916 A1 * | 12/2002 | Frish et al. ...................... | 385/43 |
| 2004/0184704 A1 * | 9/2004 | Bakir et al. ..................... | 385/14 |
| 2009/0087141 A1 | 4/2009 | Kim et al. | |

OTHER PUBLICATIONS

Marcuse, D., Light Transmission Optics, Chapter 9, Dielectric Waveguides With Imperfections, 1982, pp. 406-414, Van Nostrand Reinhold.
Adams, A.C., Dielectric and Polysilicon Film Deposition, Table 5.16 Comparison of Different Silicon Dioxide Growth/Deposition Processes, VLSI Technology, 1988, 1 page, S. M. Sze, Ed. McGraw-Hill, New York.
Alder, T. et al., High-Efficiency Fiber-to-Chip Coupling Using Low-Loss Tapered Single-Mode Fiber, IEEE Photonics Technology Letters, Aug. 2000, pp. 1016-1018, 12(8).
Almeida, V.R. et al., Nanotaper for compact mode conversion, Optics Letters, Aug. 1, 2003, pp. 1302-1304, 28 (15).
Charavel, R. et al., Stress release of PECVD oxide by RTA, Proc. of SPIE, 2003, pp. 596-606, 5116.
Cheben, P. et al., A Broad-Band Waveguide Grating Coupler With a Subwavelength Grating Mirror, IEEE Photonics Technology Letters, Jan. 1, 2006, pp. 13-15, 18(1).
Dai, D. et al., Bilevel Mode Converter Between a Silicon Nanowire Waveguide and a Larger Waveguide, Journal of Lightwave Technology, Jun. 2006, pp. 2428-2433, 24(6).

(Continued)

*Primary Examiner* — Charlie Peng
(74) *Attorney, Agent, or Firm* — Standley Law Group LLP

(57) ABSTRACT

Development of Integrated Optical Circuits depends greatly on progress in coupling light to and between chip devices. Exemplary disclosed embodiments provide a system and method of fabricating couplers for optical chips that may allow for access to devices on the entire chip surface. Cantilever couplers comprising optical waveguides are deflected out-of-plane creating access to remote portions of devices. An exemplary system and method may provide waveguides with tunable angles of deflection creating greater flexibility in optical coupling options.

18 Claims, 11 Drawing Sheets

OTHER PUBLICATIONS

Doylend, J.K. et al., Design and Simulation of an Integrated Fiber-to-Chip Coupler for Silicon-on-Insulator Waveguides, IEEE Journal of Selected Topics in Quantum Electronics, Nov./Dec. 2006, pp. 1363-1370, 12(6).

Grillet, C. et al., Efficient coupling to chalcogenide glass photonic crystal waveguides via silica optical fiber nanowires, Optics Express, Feb. 6, 2006, pp. 1070-1078, 14(3).

Grillet, C. et al., Nanowire coupling to photonic crystal nanocavities for single photon sources, Optics Express, Feb. 5, 2007, pp. 1267-1276, 15(3).

Hwang, I-K et al., Curved-microfiber photon coupling for photonic crystal light emitter, Applied Physics Letters, 2005, pp. 131107-1-131107-3, 87.

Kawasaki, N. et al., A Novel Lensed Fiber with a Focused Spot Diameter as Small as the Wavelength, Proceeding of IEEE Conference on Optical Fiber Communication and the National Fiber Optic Engineering Conference, 2007, OW12, 3 pages.

Lee, K.K. et al., Mode transformer for miniaturized optical circuits, Optics Letters, Mar. 1, 2005, pp. 498-500, 30(5).

Lu, Z. et al., Total internal reflection-evanescent coupler for fiber-to-waveguide integration of planar optoelectric devices, Optics Letters, Aug. 1, 2004, pp. 1748-1750, 29(15).

Masanovic, G.Z. et al., A high efficiency input/output coupler for small silicon photonic devices, Optics Express, Sep. 19, 2005, pp. 7374-7379, 13(19).

McNab, S.J. et al., Ultra-low loss photonic integrated circuit with membrane-type photonic crystal waveguides, Optics Express, Nov. 3, 2003, pp. 2927-2939, 11(22).

Michael, C.P. et al., An optical fiber-taper probe for wafer-scale microphotonic device characterization, Optics Express, Apr. 16, 2007, pp. 4745-4752, 15(8).

Milton, G. et al., Mechanical fabrication of precision microlenses on optical fiber endfaces, Optical Engineering, Dec. 2005, pp. 123402-1-123402-8, 44(12).

Nguyen, V. et al., Silicon-based highly-efficient fiber-to-waveguide coupler for high index contrast systems, Applied Physics Letters, 2006, pp. 081112-1-081112-3, 88.

Noh, J.W. et al., In-plane photonic transduction of silicon-on-insulator microcantilevers, Optics Express, Aug. 4, 2008, pp, 12114-12123, 16(16).

Ollier, E., Optical MEMS Devices Based on Moving Waveguides, IEEE Journal on Selected Topics in Quantum Electronics, Jan./Feb. 2002, pp. 155-162, 8(1).

Presby, H.M. et al., Laser micromachining of efficient fiber microlenses, Applied Optics, Jun. 20, 1990, pp. 2692-2695, 29(18).

Pulskamp, J.S. et al., Mitigation of residual film stress deformation in multilayer microelectromechanical systems cantilever devices, J. Vac. Sci. Technol. B, Nov./Dec. 2003, pp. 2482-2486, 21(6).

Roelkens, G. et al., Efficient Silicon-on-Insulator Fiber Coupler Fabricated Using 248-nm-Deep UV Lithography, IEEE Photonics Technology Letters, Dec. 2005, pp. 2613-2615, 17(12).

Shiraishi, K. et al., A silicon-based spot-size converter between single-mode fibers and Si-wire waveguides using cascaded tapers, Applied Physics Letters, 2007, pp. 141120-1-141120-3, 91.

Shoji, T. et al., Low loss mode size converter from 0.3 μm square Si wire waveguides to singlemode fibres, Electronic Letters, Dec. 5, 2002, pp. 1669-1670, 38(25).

Taillaert, D. et al., An Out-of-Plane Grating Coupler for Efficient Butt-Coupling Between Compact Planar Waveguides and Single-Mode Fibers, IEEE Journal of Quantum Electronics, Jul. 2002, pp. 949-955, 38(7).

Taillaert, D. et al., Compact efficient broadband grating coupler for silicon-on-insulator waveguides, Optics Letters, pp. 2749-2751, 29(23).

Ulrich, R. et al., Theory of the Prism-Film Coupler by Plane-Wave Analysis, Journal of the Optical Society of America, Oct. 1970, pp. 1337-1350, 60(10), Dec. 1, 2004.

Vivien, L. et al., Light Injection in SOI Microwaveguides Using High-Efficiency Grating Couplers, Journal of Lightwave Technology, Oct. 2006, pp. 3810-3815, 24(10).

Yamada, H. et al., Si Photonic Wire Waveguide Devices, IEEE Journal of Selected Topics in Quantum Electronics, Nov./Dec. 2006, pp. 1371-1379, 12(6).

Yamada, K. et al., Microphotonics Devices Based on Silicon Wire Waveguiding System, IEICE Trans. Electron., Mar. 2004, pp. 351-358, E.

Sun, P. et al., Cantilever couplers for intra-chip coupling to silicon photonic integrated circuits, Optics Express, Mar. 16, 2009, pp. 4565-4574, 17(6).

* cited by examiner

CANTILEVER COUPLERS FOR INTRA-CHIP COUPLING TO PHOTONIC INTEGRATED CIRCUITS

STATEMENT REGARDING FEDERALLY SPONSORED RESEARCH OR DEVELOPMENT

The present invention was made with United States Government support under grant no. 00008244 by the National Science Foundation. The United States Government may have certain rights to this invention under 35 U.S.C. §200 et seq.

CROSS-REFERENCE TO RELATED APPLICATIONS

This non-provisional patent application makes no claim of priority to any earlier filings.

TECHNICAL FIELD

Exemplary embodiments of the present invention are in the field of integrated optical circuits, and in particular in the field of devices, systems, and methods for coupling waveguides to optical fibers. Other exemplary embodiments are in the field of devices, systems, and methods for coupling light from a light source to a chip device or between at least two chip devices. Exemplary embodiments also include methods of manufacturing such devices and systems. As discussed herein, other exemplary embodiments are also within the scope of the present invention.

BACKGROUND OF THE ART

Integrated Optical Circuits (IOC) (also known as Photonic Integrated Circuits (PIC); the two terms will be used interchangeably herein) have been under development in many laboratories and companies for over three decades. In an analogy to electronic integrated circuits, developers of IOC envision the possibility of combining several or many optical processing functions on a single miniature platform, such as a semiconductor chip, fabricated using processes similar to those used for electronic chip production. Planar Optical Chips (POC) incorporate functional optical components such as linear or curved waveguides to conduct light from one location to another, filters fabricated from specially shaped waveguides that control the spectral characteristics of the light, and lenses and mirrors embedded in waveguides to alter the shape of the light. The POC are interfaced to other optical components and devices via optical fibers.

The waveguide components in IOC generally comprise several layers of materials. In an exemplary two-dimensional POC waveguides, a core layer of a material is covered on at least one side or, alternatively, sandwiched between two layers of clad material. The core material has a higher refractive index than the clad material. Similarly, in three-dimensional linear or curved waveguides, such as the common optical fiber, a core material is fully surrounded by a clad material.

Optical fibers are often used to transmit light signals in optical circuits and are examples of low-index-contrast waveguides. It is known, however, that low-index-contrast material systems are not optimum for IOC. High-index-contrast material systems, such as a core layer of silicon having a refractive index of approximately 3.5 clad with silica having a refractive index of approximately 1.5, offer stronger light confinement in smaller dimensions. Silica used as an insulating layer on silicon is also referred to as "oxide" or "insulator." The stronger light confinement enables miniaturization of functional optical components to sizes that are comparable to the wavelength of the confined light, and thereby enables dense integration of these optical devices on waveguide chips.

The large mismatch between the common optical fiber dimension and the high-index-contrast waveguide dimension, and their respective mode sizes, complicates coupling of light from one to the other. A number of techniques have been utilized for optical coupling between these thin waveguides and conventional optical fibers, including prism couplers, grating couplers, tapered fibers and micro-lens mode transformers. None of these coupling techniques offer the combination of high coupling efficiency, wavelength independence, ease of access to remote portions of chips, reliability, manufacturability, ruggedness, and robustness demanded for use in low-cost high-volume telecommunication component production. These techniques often require time-consuming and complex procedures to facilitate coupling and often cannot readily provide access to remote portions of devices.

In conventional semiconductor-chip optical waveguide technology, silicon waveguide chips are cleaved and polished and optical fibers are butt coupled to the polished surface for light (often laser light) injection. In addition to time consumption, this process suffers from the difficulty inherent in cleaving the chip and cleaning the debris created by the polishing process from the chip without damaging the chip itself.

Current silicon based optical circuits utilize processes compatible with complimentary metal-oxide semiconductor (CMOS) technology when fabricating circuits. Silicon strip waveguides produced using CMOS compatible processes often have submicron cross-sections. The small cross-section, while a positive for fabricating small devices, makes conventional coupling technology very difficult as the cleaving and polishing that is normally required is hampered by the sub-micron size of the devices.

Devices fabricated from CMOS compatible processes have highly confined optical modes, due to the large difference between the refractive indices of the two materials, allowing for densely integrated optical waveguides and small radius of curvature waveguide bends. However, this carries with it an inherent problem. The small size of the silicon strip waveguides makes coupling them with optical fibers challenging due to the difference in mode field diameters (MFD's) between the optical fibers and the waveguides themselves. The large difference in MFD's can lead to coupling losses of more than 20 dB. There exists a need for combining the use of CMOS silicon circuits with a more efficient, accessible, and compatible technology for coupling a laser light source to devices on the entire chip surface.

SUMMARY OF THE INVENTION

This and other unmet needs of the known art may be met by an exemplary device as described in more detail below.

Exemplary embodiments of cantilever couplers present a solution enabling intra-chip and inter-chip coupling without the need for complex grating and evanescent based structures. The couplers may be realized on-chip and comprise materials common to CMOS technology used in the semi-conductor integrated circuit industry.

Exemplary embodiments of the couplers may include cantilevers with a semiconductor waveguide core. The cantilevers may be comprised of two materials layered about a waveguide core. The materials that comprise the layers may have thermal anneal properties such that when heat is applied to the laminate the cantilever will deflect out-of-plane such that efficient coupling with, for example, an optical fiber, adjacent chip, or a combination of both, may be achieved. In an exemplary embodiment, the waveguide(s) incorporate inverse width tapers. As used herein, the term inverse-width taper refers to a progressive narrowing of the width of a waveguide core when traveling along the length of the waveguide from the chip-device end toward the terminal end-face of the waveguide. The rate at which the waveguide core narrows may be defined by a linear, quadratic, or other equation.

In an exemplary embodiment, the couplers include $SiO_2$ cantilevers and Si inverse width tapers. The Si inverse width tapers are embedded in the center of the $SiO_2$ cantilevers, which may be comprised of layers of buried oxide (BOX) and plasma-enhanced chemical vapor deposition (PECVD) $SiO_2$. The $SiO_2$ cantilevers are released from the substrate near the end-face of the Si inverse width tapers. The PECVD $SiO_2$ layer functions as an optical cladding for the Si waveguides and as a stress layer to deflect the free-standing $SiO_2$ cantilevers. The stress in the BOX-PECVD $SiO_2$ bilayer deflects the $SiO_2$ cantilevers, and, correspondingly, the waveguides contained in the cantilever(s), out-of-plane. Tapered or lensed optical fibers may then be used to couple to the $SiO_2$ cantilevers.

BRIEF DESCRIPTION OF THE DRAWINGS

A better understanding of the exemplary embodiments of the invention will be had when reference is made to the accompanying drawings, wherein identical parts are identified with identical reference numerals, and wherein.

DETAILED DESCRIPTION OF EXEMPLARY EMBODIMENT(S)

Figure 1:
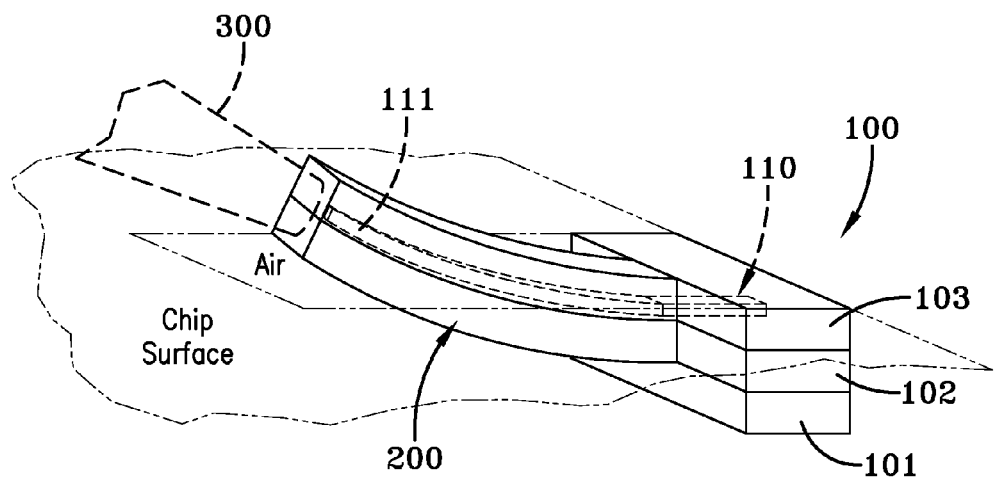
FIG. 1 is a schematic illustrating the general arrangement of layers in an exemplary embodiment of the cantilever coupler.

Turning to the drawings for a better understanding, FIG. 1 shows an embodiment of an optical device 100 with a cantilever coupler 200, the device being coupled to an optical fiber 300. The device of FIG. 1 comprises materials common to CMOS technology and compatible with photonic integrated circuits. The device 100 includes several layers, namely a substrate layer 101, a first material layer 102, a second material layer 103, and a waveguide core 110 sandwiched between the first cladding material layer and the second material layer. The waveguide includes a tapered segment 111. It is clear from the drawing that the elongate cantilever 200 deflects out of the plane defined by the device by an angle α; correspondingly, a length of the waveguide is deflected upward with the cantilever. In an exemplary embodiment, the substrate layer comprises Si, the first material layer comprises silicon oxide ($SiO_2$), the second material layer comprises $SiO_2$, and the waveguide core comprises silicon. The light that is coupled via the cantilever(s) 200 may originate from any one of several light sources (not shown) including: a laser, a light emitting diode, a second chip (with or without a cantilever coupler), etc.

Figure 2:
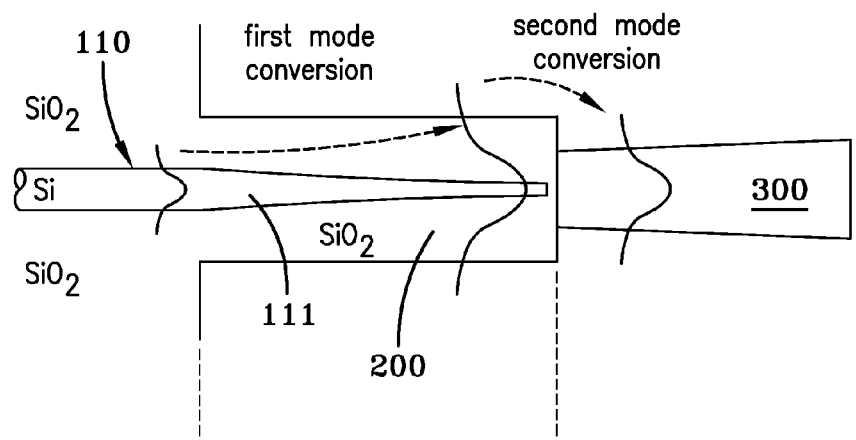
FIG. 2 is a schematic illustrating the two-step mode conversion in an exemplary embodiment of the cantilever coupler.

FIG. 2 is a top view of an optical device with a cantilevered coupler. The coupler of FIG. 2 includes a waveguide core 110; in an exemplary embodiment, the waveguide core tapers to a smaller width as it nears the end of the coupler, an example of an inverse-width taper. FIG. 2 also illustrates the two-step mode conversion as light travels from the waveguide to the optical fiber. The first mode conversion is from the waveguide mode to the delocalized mode at the end of the inverse taper. The second mode conversion is from the delocalized mode to the optical fiber mode. In an exemplary embodiment, the distance between the endface of the cantilever(s) 200 and the end of the waveguide core 110 is approximately 1 μm. Where appropriate, the waveguide may not be exposed to air on the endfaces because particular etching processes required to release the cantilevers may also attack the waveguide material.

The cantilevers 200 are sufficiently long such that the released ends are deflected sufficiently to allow for out-of-plane coupling to tapered or lensed fibers. In an exemplary embodiment, the cantilever length is approximately 40 μm. Alternatively, the cantilever coupler may be longer. This longer cantilever allows for a more significant angle of deflection. The width of the cantilevers is designed to accommodate the waveguide mode delocalized by the inverse tapers. The width of the cantilevers may be optimized to optimize coupling efficiency. Additionally, in an exemplary embodiment, the length of the taper portion of the waveguide is substantially equal to the length of the released cantilever (40 μm here), thus the deflected portion of the waveguide may primarily include the tapered segment.

Figure 3:
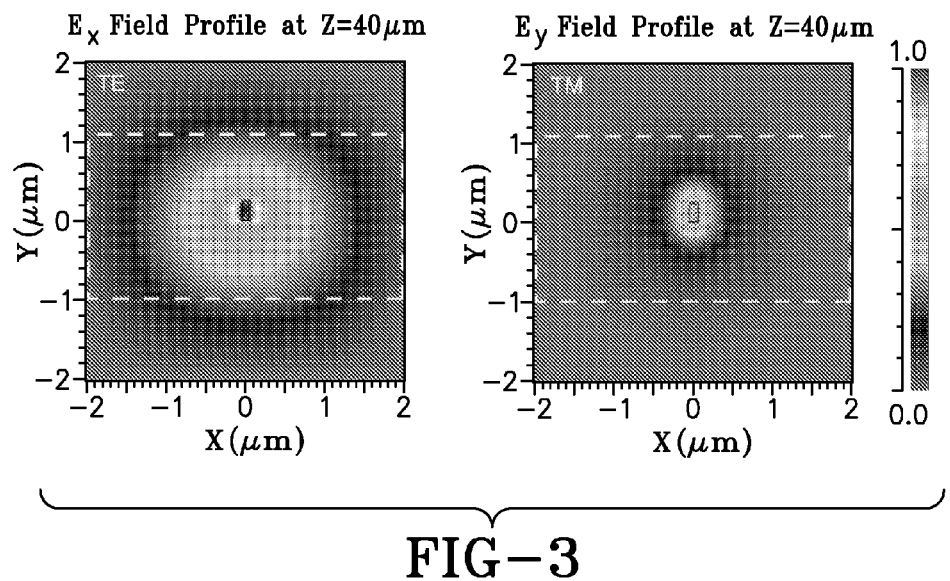
FIG. 3 includes contour maps of primary electric fields at the tip of a 40 μm long Si inverse width taper in $SiO_2$ cladding.

Contour maps of simulated electric fields at the tip of a Si inverse taper are shown in FIG. 3. The simulations include a Si inverse width taper buried in $SiO_2$ cladding, and are performed using beam propagation method (BPM). In this example, the waveguide end of the taper is 450 nm in width and 250 nm in height, and the reduced end of the taper is 100 nm in width; the inverse taper of the simulation is 40 μm long and has a quadratic taper profile. It is clear from FIG. 3 that the delocalized TE mode has an MFD of ~1.5 μm, and the delocalized TM mode has an MFD of ~0.8 μm. The delocalized TE and TM modes are well confined within a 4 µm wide by 2.1 µm high cross section, which is denoted in FIG. 3 by white dashed lines.

In the following exemplary embodiment of a fabrication process, $SiO_2$ cantilevers with nominal length of 40 µm and width of 4 µm are fabricated. However, cantilever couplers with a length of about 250 µm and widths about 2.5 µm may be fabricated using similar embodiments. The estimated coupling efficiency, for a tapered fiber MFD of 1.5 µm and a cantilever end-face to taper tip distance of 2 µm, is −0.35 dB (TE) and −0.74 dB (TM). The bending loss of the $SiO_2$ cantilevers is worth consideration since dielectric waveguides cannot guide light around bends without losing power. The bending loss calculated using effective index method (EIM) and the weak guidance approximation can be safely ignored for this radius of curvature. When the deflection is smaller than 12 µm, the bending loss will be even smaller.

Figure 4:
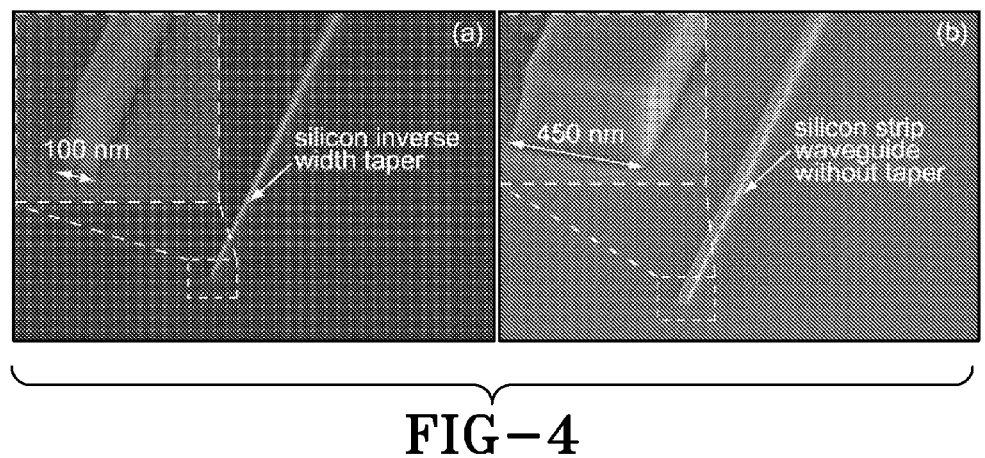
FIG. 4 is set of scanning electron micrographs of silicon strip waveguides.

Exemplary embodiments of the cantilever couplers were fabricated employing silicon as a waveguide substrate, BOX $SiO_2$ as a first layer material, PECVD $SiO_2$ as a second layer material, and Si as the material for the device. Cantilever couplers may be fabricated on a silicon-on-insulator (SOI) wafer by electron-beam, ion-beam, and/or deep ultraviolet lithography processes. Silicon waveguides may be fabricated first according to the following exemplary embodiment. An SOI wafer with 250 nm Si and 1 µm BOX was cleaned and dehydrated. HSQ in MIBK (Dow Corning XR-1541) was spun-coated at 3000 rpm for 45 sec. The residual solvent in the HSQ film was driven out by soft-bake on hotplates at 120° C. for 2 min and then at 220° C. for 2 min. Si strip waveguide cores were defined using an electron-beam lithography (Leica EBPG-5000) tool at 50 kV. Two types of silicon strip waveguides were fabricated, one with inverse width tapers at the input and output ends, and the other without inverse tapers at either end. After exposure the resist film was developed in 0.26 N TMAH solution. The resist patterns were transferred to the 250 nm thick silicon top layer by inductively-coupled plasma etching with HBr-chemistry. The HBr etching automatically stops at the BOX surface with $Si/SiO_2$ etching selectivity of more than 20. FIG. 4 shows scanning electron micrographs of silicon waveguides after the HBr etching.

Figure 5:
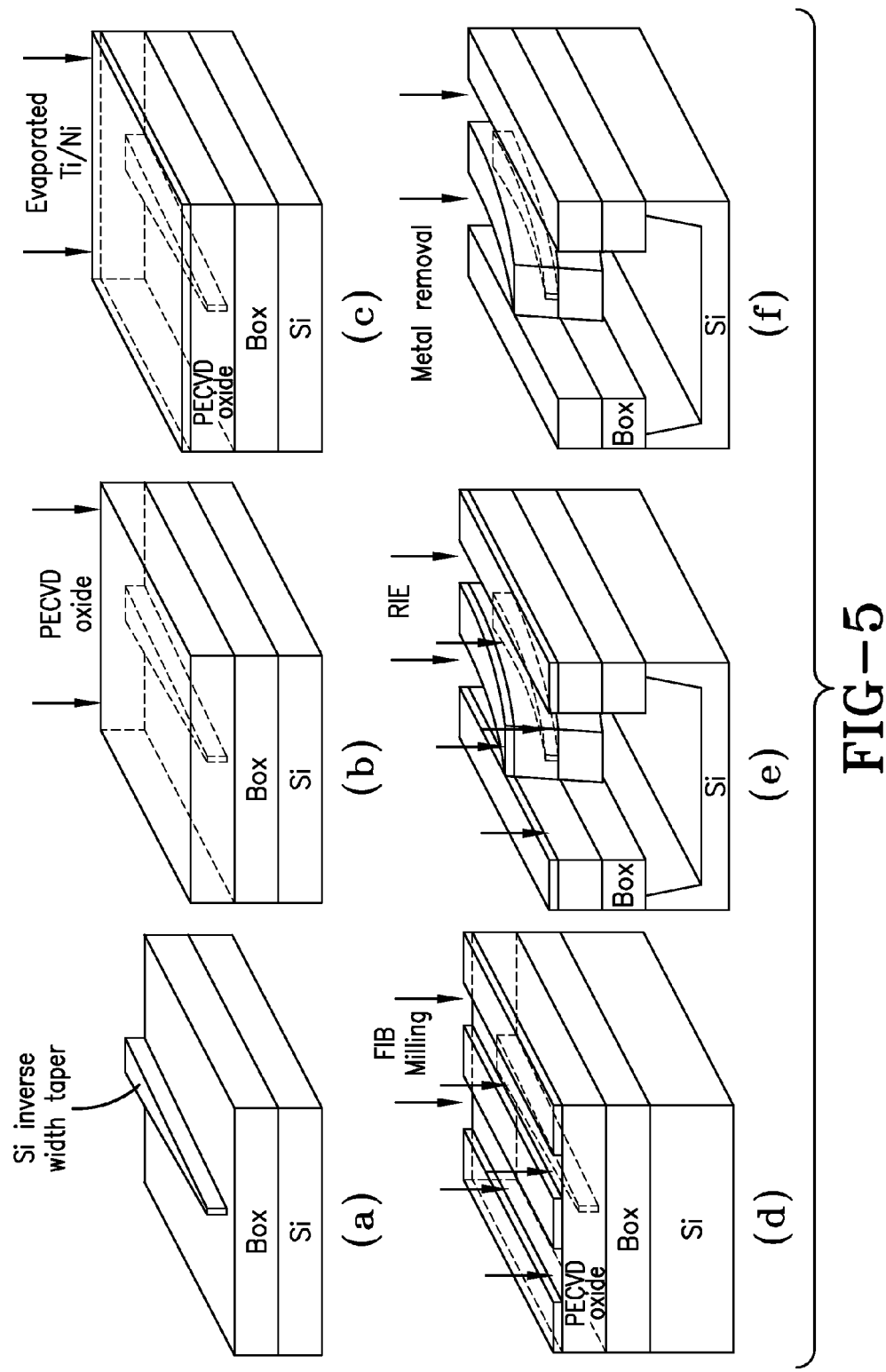
FIG. 5 is a set of drawings illustrating an exemplary embodiment of a method of fabricating a cantilever coupler.

In an exemplary embodiment, laminate comprising the cantilevers may then be fabricated according to the exemplary process flow shown in FIG. 5. First, as shown in 5(a), a waveguide core with a tapered end is fabricated on the SOI substrate. Second, as shown is 5(b), a (1.1 µm) layer of PECVD $SiO_2$ is applied using $SiH_4$-$N_2O$ chemistry at 200° C., covering the waveguide core. A 5 nm titanium adhesive layer and a 150 nm nickel mask was then evaporated on top of the PECVD $SiO_2$ (FIG. 5(c)). The patterns for the $SiO_2$ cantilevers were written directly on the Ti/Ni mask by focused Ga+ ion beam (FIB) milling at 30 kV with a nominal milling depth of 250 nm (FIG. 5(d)). The metal mask patterns were transferred to the $SiO_2$ layer by reactive ion etching (RIE) using $SF_6$ chemistry (FIG. 5(e)). The schematic shows deflection of the cantilever after ion etching, however, this is merely for illustrative purposes to demonstrate that the cantilever is released from the bulk Si device, as further deflection occurs during later heat curing or annealing. In an exemplary embodiment, the etch recipe is tuned to etch $SiO_2$ anisotropically and to etch silicon isotropically with large undercut in order to fully release the cantilevers from the substrate and aid deflection. In this exemplary embodiment, it is clear that the Si waveguide core is preferably protected from the RIE, as the RIE etches the Si chip and would also be expected to etch the waveguide. Finally, the Ti/Ni mask is removed with $HNO_3$ and HCl solutions (FIG. 5(f)).

Figure 6:
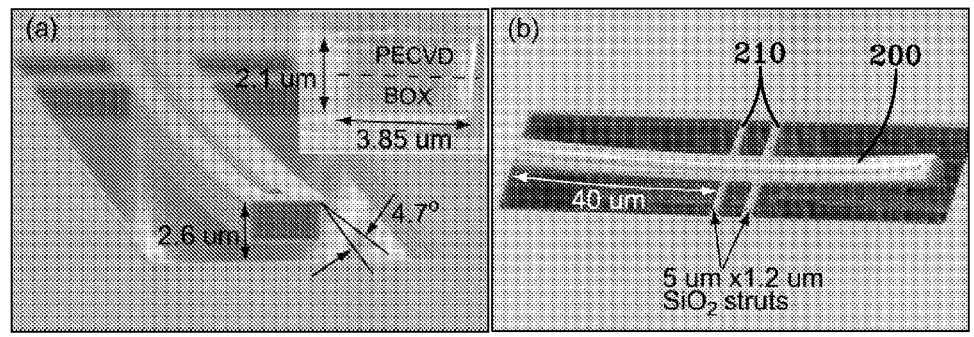
FIG. 6 is a picture of cantilever couplers produced according to a disclosed embodiment.

FIG. 6 shows scanning electron micrographs of an exemplary embodiment of the $SiO_2$ cantilevers after removal of the Ti/Ni mask. It is clear from the micrographs that the couplers have an elongate shape and the terminal end deflects out of the plane of the chip device. The final cross-sectional dimensions of the exemplary $SiO_2$ cantilevers were 3.85 µm in width and 2.1 µm in height, as shown in FIG. 6(a). The released ends of the $SiO_2$ cantilevers were deflected by 2.6 µm from the plane of the bulk device. The cantilevers have a maximum tilt angle, in this exemplary embodiment, of 4.7° at the end, which is within the travel of the pitch angle of available 6-axis fiber positioning stages. To provide mechanical support, 5 µm long and 1.2 µm wide $SiO_2$ struts 210 may be used as anchors, as shown in FIG. 6(b). The struts may be formed during the cantilever fabrication process and include the same materials as the cantilevers save the Si waveguide, and may be placed at various lengths along the cantilever(s). The struts may deform slightly under the stress accompanying the deflection of the cantilever. By increasing the length of the struts, the cantilever deflection can be increased for a given cantilever length or stress, allowing for differing access angles for laser coupling.

To verify the stress source that deflects the $SiO_2$ cantilevers, similar cantilevers were fabricated, using the construction embodiment detailed above, on two different $SiO_2$ films. First, $SiO_2$ cantilevers were fabricated on a blank area of the same chip that was used to fabricate the test waveguides in the above embodiment. In this example, these cantilevers include the same BOX and PECVD $SiO_2$ layers, but did not have Si waveguides in the center. Second, a bare SOI wafer with 250 nm Si and 1 µm BOX was cleaned, and the Si top layer was completely removed by TMAH wet etching. $SiO_2$ cantilevers that include only BOX were fabricated with the same exemplary method as that described in FIG. 5(b-f). The BOX-PECVD $SiO_2$ cantilevers that contain no Si core had the same bending profile as that of the cantilevers with Si cores. The cantilevers that include only BOX did not deflect. It can be concluded that the stress in the BOX-PECVD $SiO_2$ bi-layer accounts for the deflection of cantilevers in this embodiment.

The cantilever profile is expected to change if the PECVD $SiO_2$ deposition migrates to other PECVD platforms. To keep processing temperatures below 400° C., the cantilever length or strut length may be modified in order to produce the desired deflection angle. Alternatively, post-fabrication modification of cantilever profiles may be utilized.

Figure 7:
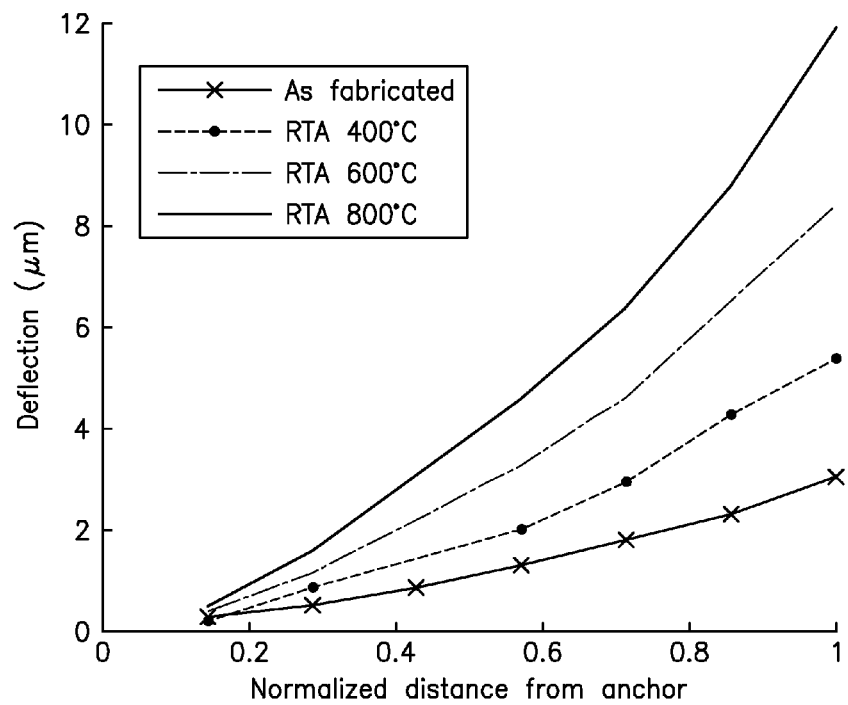
FIG. 7 is the deflection of cantilever couplers controlled using rapid thermal annealing (RTA).

To explore thermal control, a chip prepared using the exemplary method described for FIG. 5, was heated with an RTA apparatus in $N_2$ ambient for 1 min at 400° C., 600° C., and 800° C. sequentially. After annealing at each temperature, the cantilever profile was measured by scanning electron microscopy. The measurement results showed that the shear-stress, and corresponding deflection, in the BOX-PECVD $SiO_2$ bi-layer increases with increasing temperature, as shown in FIG. 7. For as-fabricated exemplary $SiO_2$ cantilevers, the tilt angle $\alpha$ was 4.7°, and the deflection at the end of the cantilevers was 2.6 µm. In this case, only tapered fibers may be used for butt-coupling. However, after annealing at 800° C., the tilt angle increased to 30°. The larger tilt angle allows lensed fibers with conical angle greater than 60° to be used for light coupling.

An important consideration regarding practical applications of the exemplary cantilevers is uniformity and repeatability of deflection and tilt angle $\alpha$ of the $SiO_2$ cantilevers 200 from the plane of the device. Since the deflection is mainly caused by the stress in the BOX-PECVD $SiO_2$ structure, it is expected that cantilever profiles will be the same in regions where the stress is uniform. As proof, cantilevers fabricated using the exemplary method described above were stored for 3 months in a laboratory environment without noticeable change in deflection of the cantilevers.

Figure 8:
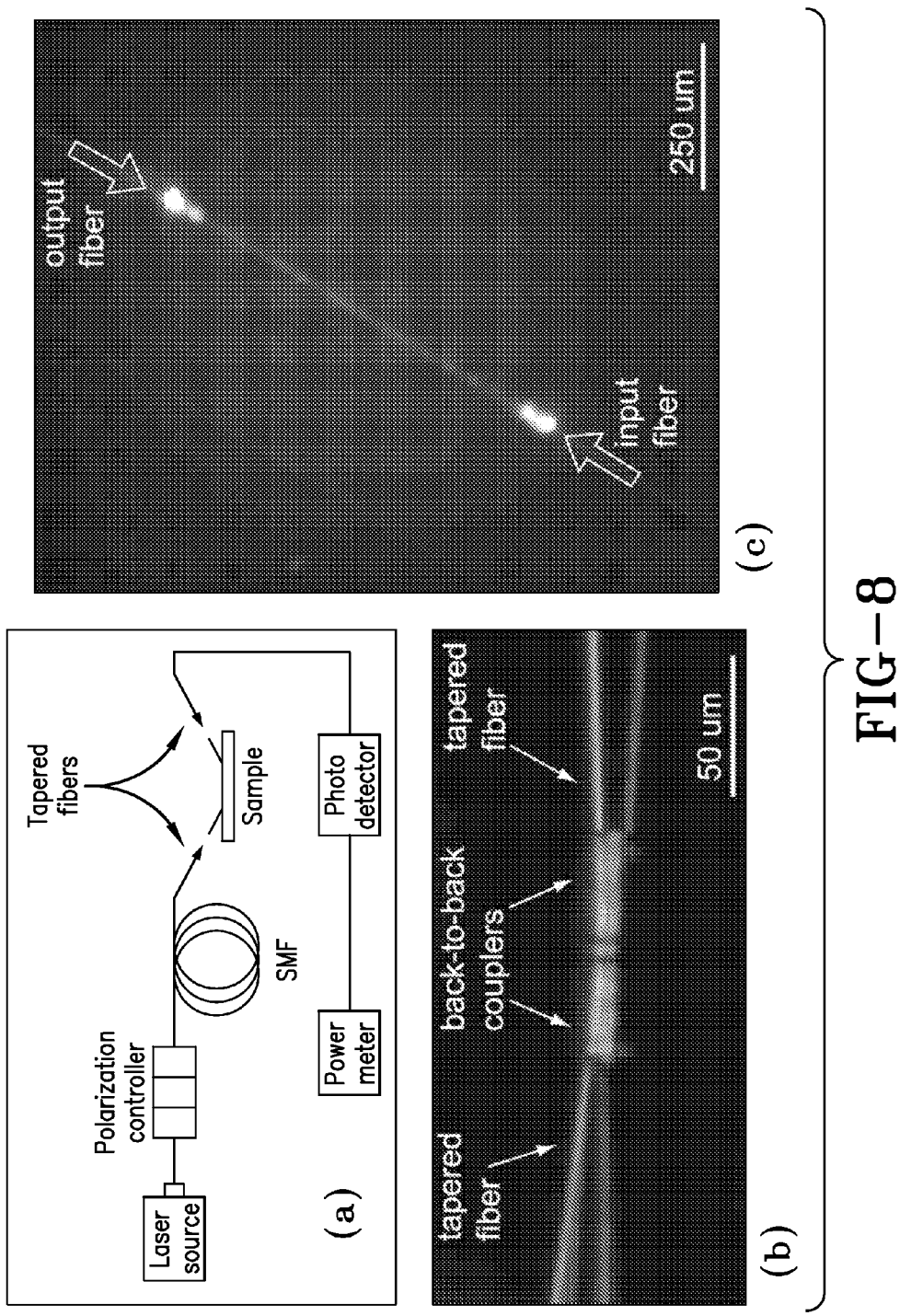
FIG. 8 is a diagram and pictures of a system for coupling a cantilevered chip with a laser light source.

A schematic showing an experimental setup for optical characterization of devices adapted with an embodiment of deflected waveguides made by the method discussed above is shown in FIG. 8(a). The devices were tested as follows: an infrared continuous-wave laser source was first connected to a polarization controller which outputs linearly polarized TE or TM light with cross-polarization rejection ratio of more than −17 dB. Two tapered optical fibers with tip diameters of ~1.5 μm were fabricated and mounted on 6-axis positioning stages. Light in the output fiber was collected by a photodetector and measured by a power meter. The tapered fibers were tilted to match the tilt angle of the $SiO_2$ cantilevers, and then butt-coupled to the input and output cantilever couplers of a waveguide, as shown in FIG. 8(b). One visible microscope was mounted at an oblique angle of ~30° for aligning tapered fibers to the cantilever couplers. A second visible-infrared microscope was mounted on top of the chip vertically to further assist fiber alignment and to monitor light injection in waveguides, as shown in FIG. 8(c).

Figure 9A:
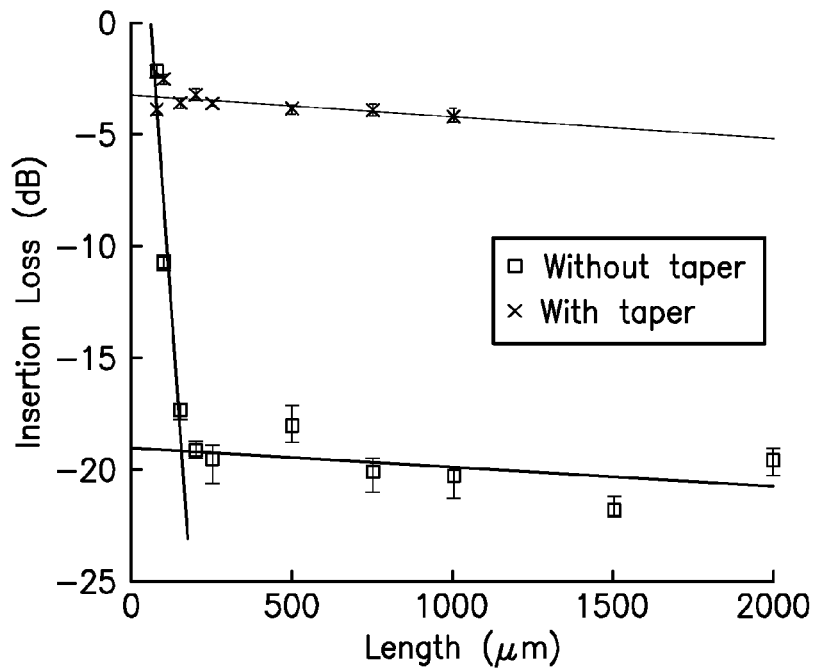
FIG. 9 shows insertion loss measurements versus propagation length at 1.55 μm wavelength for (a) TE polarization, and (b) TM polarization.
Figure 9B:
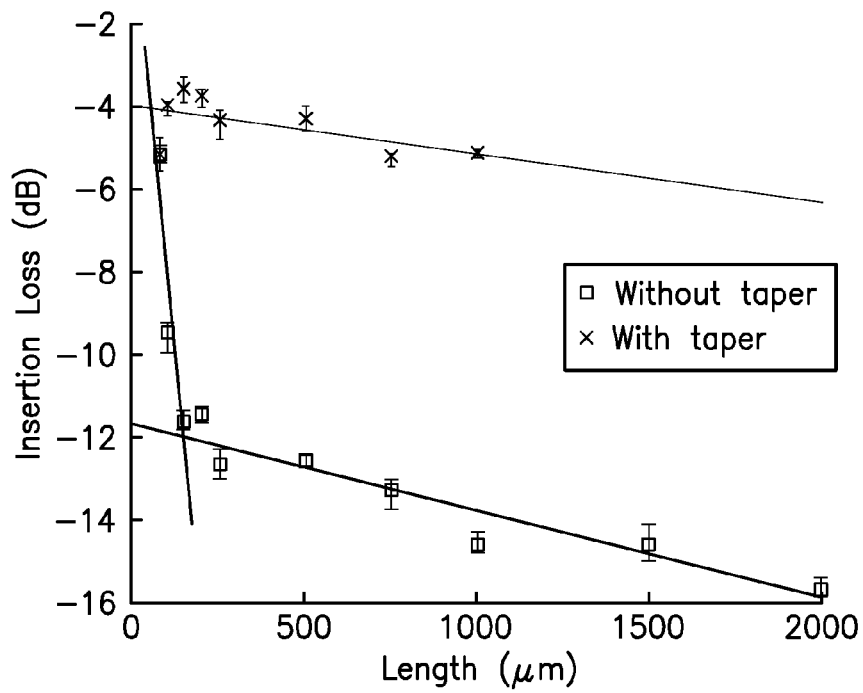

Transmission measurements were taken on exemplary silicon waveguides of various lengths. The insertion loss measured at 1.55 μm wavelength is plotted versus waveguide length in FIGS. 9(a) and 9(b) for TE and TM polarization respectively. The waveguide length includes the 40 μm input and 40 μm output cantilever couplers. Each waveguide was measured four times independently. Upper and lower bounds, due primarily to fiber alignment errors, are denoted by vertical bars. The discrete data points are fitted by linear regression. Coupling loss per pair of cantilever couplers is extracted from the Y-interception of the regression line, and the propagation loss of the Si waveguides per unit length is extracted from the slope of the regression line. As shown in FIGS. 9(a) and 9(b), the propagation loss of the Si waveguides is 9.5 dB/cm for TE polarization and 16.5 dB/cm for TM polarization. The fiber-to-waveguide coupling loss is 1.6 dB per connection for TE polarization and 2 dB per connection for TM polarization. The insertion loss of the waveguides with inverse tapers at both ends was improved over that of the waveguides without tapers at either end by 16 dB for TE polarization and 7.8 dB for TM polarization given the same waveguide length.

Insertion loss of waveguides without tapers may be affected by the formation of air-backed $SiO_2$ microfibers. When the waveguide length is close to the total length of the input and output cantilever couplers, all or most of the Si waveguide is in the air-backed $SiO_2$ cantilevers and the cantilevers function as a microfiber. Since there is no Si inverse taper for mode conversion, most of the light power will propagate in the $SiO_2$ microfibers rather than in the Si waveguides.

Figure 10:
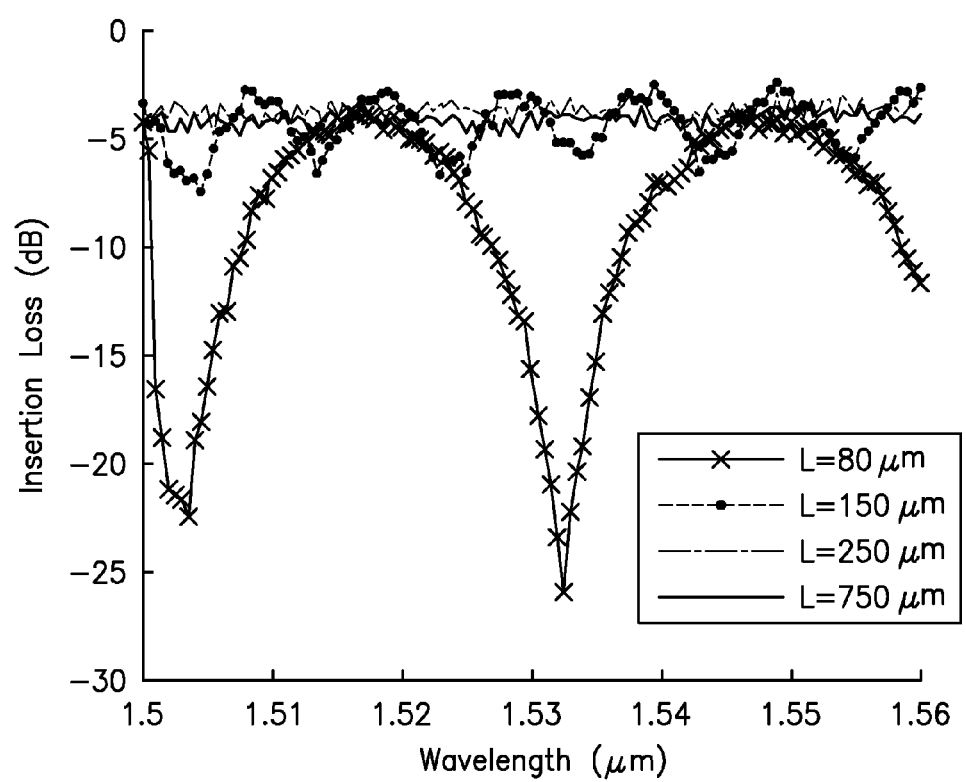
FIG. 10 shows the measured insertion loss of cantilever-coupled Si waveguides.

The spectral response of Si waveguides with inverse tapers at both ends is shown in FIG. 10. When the Si waveguides are very short, Fabry-Perot cavity effects becomes significant. For the exemplary case of an 80 μm long waveguide, the structure includes two back-to-back silicon inverse width tapers. Reflections occur everywhere along the tapers so that the two tapers form a distributed Fabry-Perot cavity. As the Si waveguide length increases, the Fabry-Perot cavity effect diminishes. For a 750 μm long Si waveguide, the insertion loss changes by less than 1.6 dB over the wavelength range of 1500 nm to 1560 nm, illustrating little dependence of the coupling efficiency on wavelength.

Figure 11:
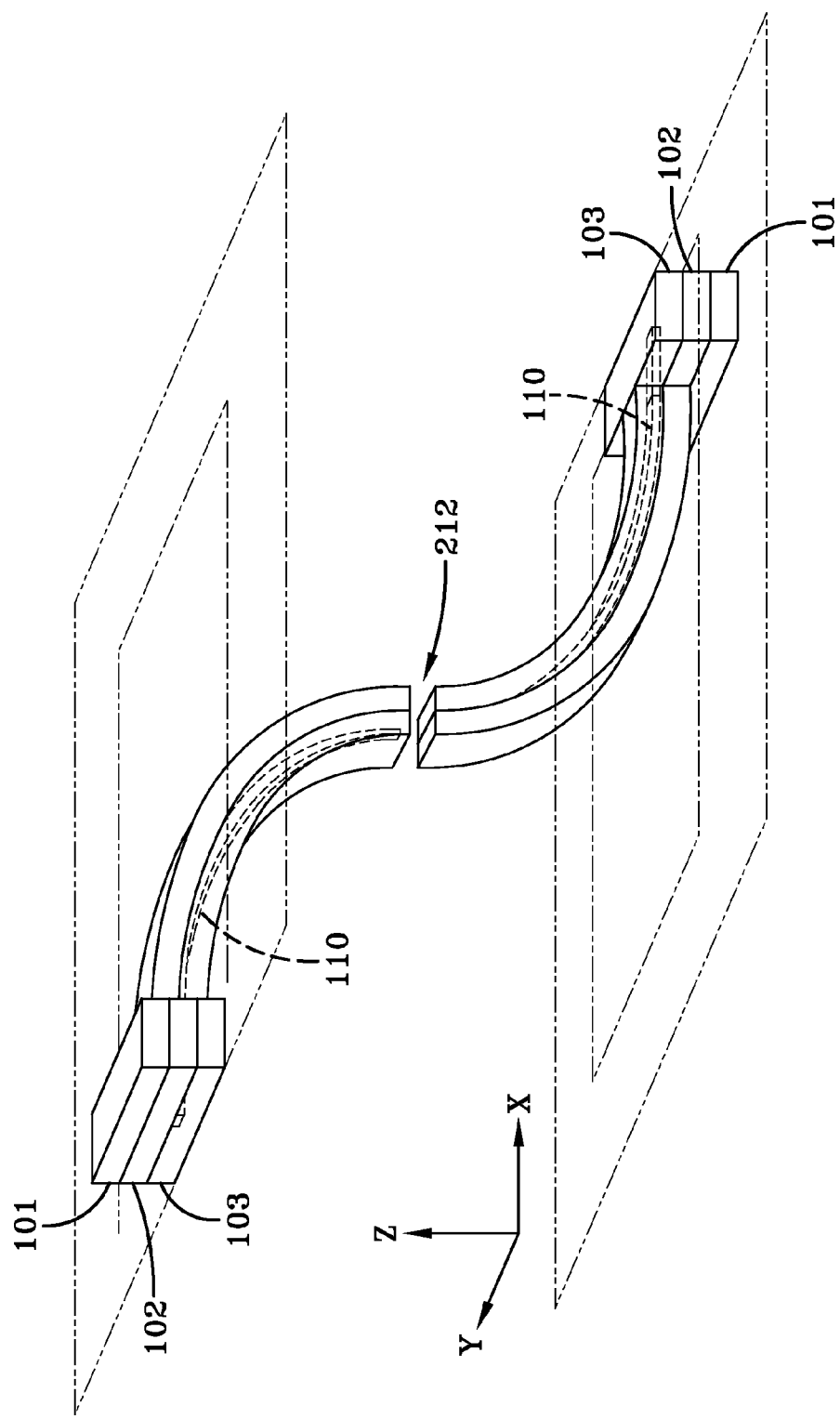
FIG. 11 is a schematic of vertical interchip coupling employing an exemplary embodiment of cantilever couplers.

As noted above, thermal annealing of an exemplary embodiment of a cantilever coupler having a length of about 40 μm at 800° C. resulted in deflection of about 30°, however there may be a need for vertical light coupling which requires larger deflection angles. FIG. 11 shows an exemplary embodiment of vertical light coupling employing cantilever couplers. Each device in FIG. 11 includes a substrate layer 101, a first material layer 102, a second material layer 103 and a waveguide core 110. Of particular note is the coupling interaction 212, between the devices as the near ninety degree deflection allows for vertical coupling.

Figure 12:
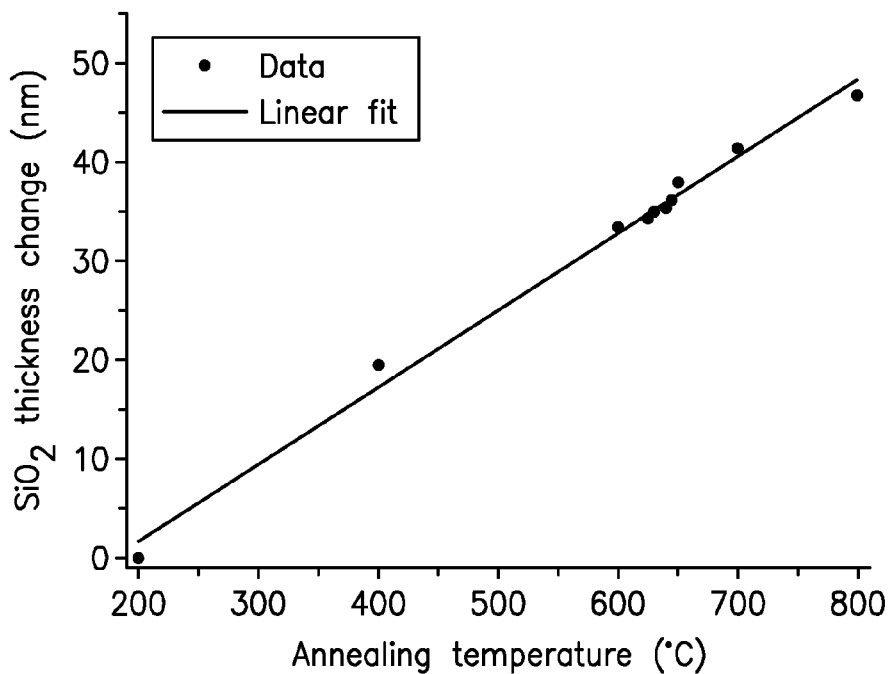
FIG. 12 shows the thickness change of a 2.1 μm BOX+ PECVD $SiO_2$ layer after annealing at different temperatures for 1 min respectively.

Deflection of the exemplary cantilever couplers is mainly due to the shear stress generated by the differing responses that the first and second material layers have. This stress can be quantified by the amount that a bi-layer of these materials shrinks under variable annealing temperature. FIG. 12 is a plot of the change in thickness of a 1 μm BOX+1.1 μm PEVCD $SiO_2$ bi-layer after annealing at different temperatures. It is clear from this plot that the relationship is linear at least up to 800° C. Lengthening of the cantilever allows access to greater deflection angles at lower temperatures.

Figure 13:
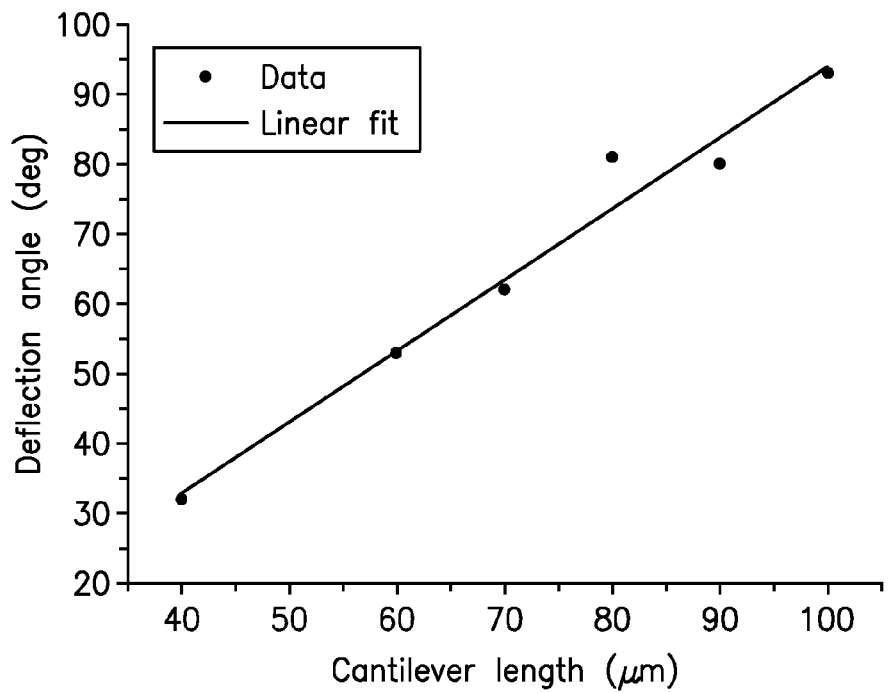
FIG. 13 shows the deflection angle of cantilevers after annealing at 800° C. plotted versus the cantilever length. For a cantilever length of 100 μm, a deflection angle of 93° is achieved.
Figure 14:
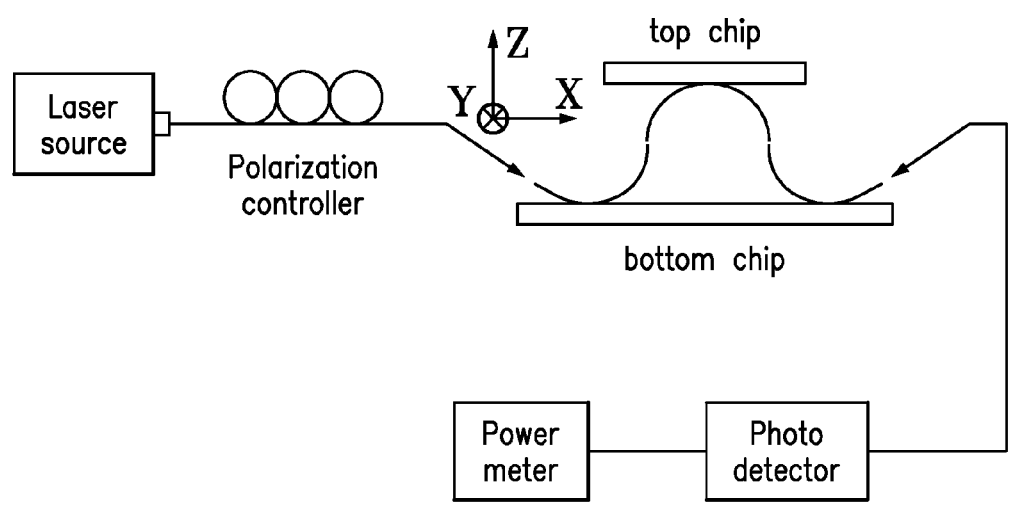
FIG. 14 is a schematic of the measurement setup to test vertical chip-to-chip coupling.

FIG. 13 is a plot of the deflection angle of cantilevers of varying length, produced according to the examples above, when subjected to annealing at 800° C. for 1 min. It is clear from this plot that greater angles of deflection are generated by increasing cantilever length; particularly, for example, the 93° deflection achieved by the 100 μm cantilever. Optical transmission measurements were performed to characterize vertical coupling schemes. FIG. 14 is a schematic demonstrating an optical transmission system. An infrared tunable laser is connected to a polarization controller, which outputs linearly polarized TE light with cross-polarization rejection ratio of more than −17 dB. Two tapered optical fibers with tip diameters of about 1.5 μm are mounted on 6-axis positioning stages and coupled to intra-chip cantilever couplers on the bottom chip. The top chip is mounted onto a 5-axis positioning stage with piezo-electrically driven XYZ-movement and manually driven yaw and roll movement. The coupling loss of interchip cantilever couplers is about 12 dB per connection for TE polarization for this exemplary embodiment. The primary cause of the loss is translational and angular misalignment of the canitlevers.

The coupling method demonstrated in this work may enable direct access to devices on an entire chip surface without dicing or cleaving, including vertical and inter-chip coupling. For example, coupling losses of 1.6 dB per connection for TE polarization and 2 dB per connection for TM polarization are achieved. The coupling efficiency shows little wavelength-dependence, with less than 1.6 dB fluctuation over the wavelength range of 1500 nm to 1560 nm.

Figure 15A:
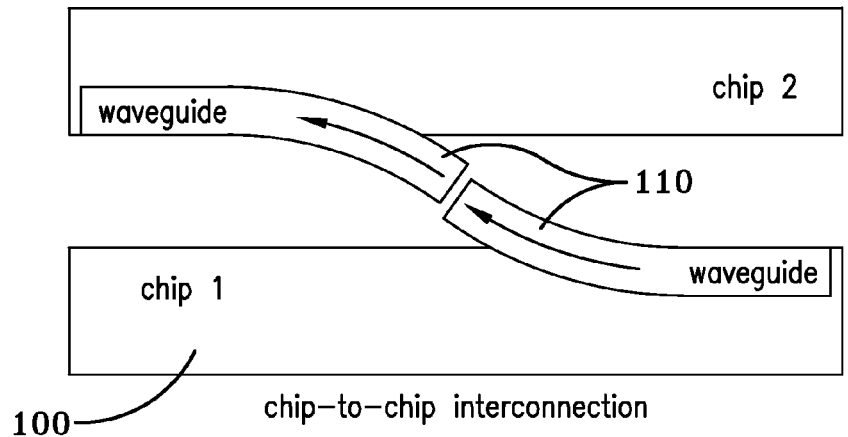
FIG. 15 is a schematic drawing depicting potential uses for the cantilevered coupler.
Figure 15B:
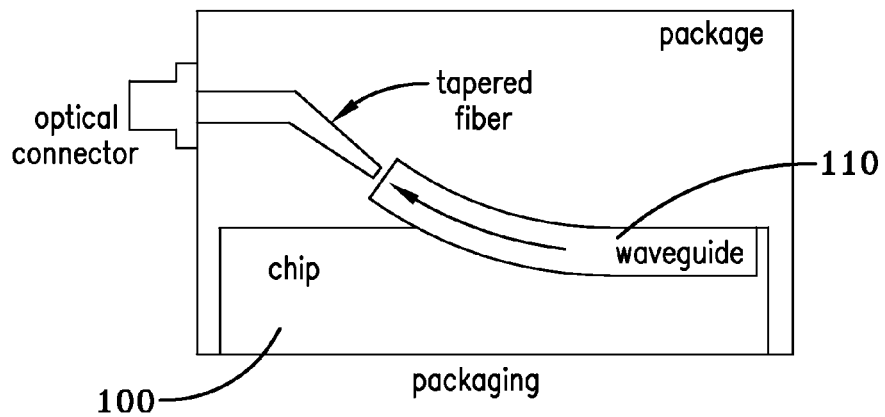
Figure 15C:
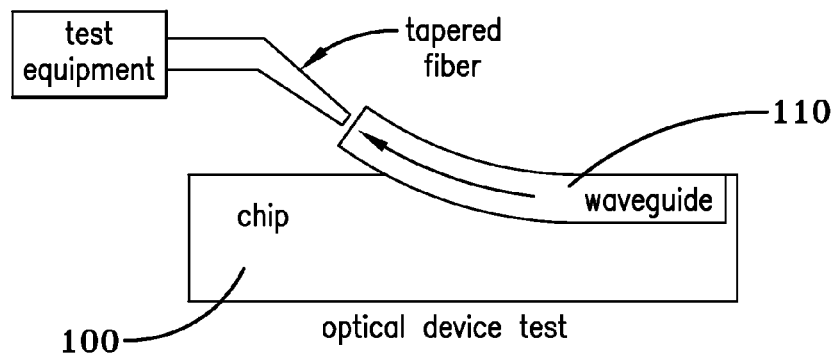

FIG. 15 shows various exemplary embodiments for chip-devices 100 adapted with embodiments of deflected cantilever couplers including waveguide core(s) 110. FIG. 15(a) shows a multi-device arrangement where light may be coupled via deflected couplers at suitable angles from chip to chip. FIG. 15(b) shows an arrangement where a device adapted with a deflected coupler is coupled to an optical connector via a tapered fiber. FIG. 15(c) illustrates an arrangement for testing an embodiment of a deflected cantilever-coupler. It is important to note that unlike conventional coupling, which requires cleaving and polishing of chips in order to introduce a light source, the deflected cantilever couplers may be fabricated at nearly any point on a device, allowing for more flexibility in coupling.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described an embodiment of the invention, those skilled in the art will realize that many variations, combinations, and modifications may be made to affect the described invention and still be within the scope of the claimed invention. Additionally, many of the elements indicated above may be altered or replaced by different elements, which may provide the same result and fall within the spirit of the claimed invention. It is the intention, therefore, to limit the invention only as indicated by the scope of the claims.

What is claimed is:

1. A device for coupling light from a light source to a chip device, comprising;
    a substantially planar chip device; and
    a cantilever coupler;
        the cantilever coupler comprising an elongate on-chip laminate with a chip interface end and a terminal end, the laminate comprising a first silica waveguide cladding material layer having a first stress-response property and a second silica waveguide cladding material layer having a second stress-response property that differs in quantity from said first stress-response property such that the laminate is passively deflected out of the plane of the planar chip device such that the laminate is adapted to convey light from an oblique light source relative to a base substrate of the chip device.

2. The device of claim 1 further comprising a waveguide core sandwiched between the layers of the laminate.

3. The device of claim 2 wherein the chip device comprises CMOS compatible materials.

4. The device of claim 3 wherein the waveguide core is comprised of a silicon waveguide.

5. The device of claim 4 wherein the first material layer comprises a layer of BOX silica.

6. The device of claim 5 wherein the second material layer comprises a layer of PECVD silica.

7. The device of claim 6 wherein the coupler is less than about 10 μm in width and less than about 500 μm in length.

8. The device of claim 6 wherein the width of the waveguide core tapers toward the terminal end.

9. The device of claim 8 wherein the cantilever coupler includes struts along the length of the laminate.

10. A system for chip-to-chip coupling of light between at least two chip devices, the system comprising:
    a substantially planar first chip device with a cantilever coupler deflected out of the plane of the first chip device;
        the cantilever coupler comprising an elongate on-chip laminate with a chip interface end and a terminal end, wherein the laminate comprises a first silica waveguide cladding material layer and a second silica waveguide cladding material layer sandwiched about a waveguide core, the first silica waveguide cladding material layer having a first stress-response property and the second silica waveguide cladding material layer having a second stress-response property that differs in quantity from said first stress-response property such that the laminate is passively deflected out of the plane of the first chi device and wherein the laminate is adapted to convey light from the first chip device to a second chip device;
    a substantially planar second chip device comprising a cantilever coupler deflected out of the lane of the second chi device;
    a base substrate of the first chip device and a base substrate of the second chip device oriented in a substantially parallel fashion; and
    the cantilever couplers positioned to couple light from the first chip device to the second chip device at suitable respective angles to the planes defined by the respective base substrates of the first and second chip devices.

11. The system of claim 10 wherein at east one of the cantilever couplers is passively deflected more than 30 degrees out of the plane of the respective chip device.

12. A device for coupling a light source to a photonic integrated circuit comprising:
    an optoelectronic layer; and
    a multi-layer laminate coupler, comprising:
        a first waveguide cladding layer of a first material having a first stress-response property;
        an optical waveguide core in communication with the optoelectronic layer;
        a second waveguide cladding layer of a second material having a second stress-response property, the difference in quantity between the first and second stress response properties adapted to cause shearing;
        wherein an elongate portion of the laminate including the waveguide core is passively deflected out of the plane relative to a base substrate of the circuit.

13. The device of claim 12, wherein the released portion of the laminate is less than about 500 μm in length, and less than about 10 μm in width.

14. The device of claim 13, wherein the width, of the portion of the waveguide core within the elongate portion, tapers toward a terminal end.

15. The device of claim 14, wherein the waveguide core is comprised of silicon.

16. The device of claim 15, wherein the first material comprises buried oxide silica, and the second material comprises plasma-enhanced chemical vapor deposited silica.

17. The device of claim 12 further comprising a photodetector.

18. The system of claim 12, adapted for optical device packaging and further comprising:
    an optical connector; and
    a tapered fiber in communication with the optical connector and the waveguide core.

* * * * *